US010503703B1

(12) United States Patent
Konduru et al.

(10) Patent No.: US 10,503,703 B1
(45) Date of Patent: Dec. 10, 2019

(54) METHOD FOR PARALLEL FILE SYSTEM UPGRADE IN VIRTUAL STORAGE ENVIRONMENT

(71) Applicant: EMC Corporation, Hopkinton, MA (US)

(72) Inventors: Jayasekhar Konduru, Sunnyvale, CA (US); Shuang Liang, Sunnyvale, CA (US); Mahesh Kamat, San Jose, CA (US); Akshay Narayan Muramatti, San Jose, CA (US); Arun Keshavamurthy, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 682 days.

(21) Appl. No.: 15/191,236

(22) Filed: Jun. 23, 2016

(51) Int. Cl.
  *G06F 16/18* (2019.01)
  *G06F 16/11* (2019.01)
  *G06F 16/13* (2019.01)
  *G06F 16/188* (2019.01)
  *G06F 16/182* (2019.01)

(52) U.S. Cl.
  CPC .......... *G06F 16/1858* (2019.01); *G06F 16/11* (2019.01); *G06F 16/13* (2019.01); *G06F 16/188* (2019.01); *G06F 16/1827* (2019.01)

(58) Field of Classification Search
  CPC ............... G06F 17/30224; G06F 16/1858
  See application file for complete search history.

(56) References Cited

U.S. PATENT DOCUMENTS

| 9,910,617 | B2 * | 3/2018 | Hasegawa | G06F 3/0643 |
| 2006/0010290 | A1 * | 1/2006 | Sasamoto | G06F 3/0605 |
| | | | | 711/114 |
| 2015/0113222 | A1 * | 4/2015 | Naik | G06F 12/0808 |
| | | | | 711/133 |
| 2016/0378818 | A1 * | 12/2016 | Marcotte | G06F 16/2379 |
| | | | | 707/703 |
| 2017/0024161 | A1 * | 1/2017 | Katiyar | G06F 3/0647 |
| 2017/0315739 | A1 * | 11/2017 | Ratra | G06F 3/0619 |
| 2017/0315800 | A1 * | 11/2017 | Song | G06F 3/0619 |

* cited by examiner

*Primary Examiner* — Richard L Bowen
(74) *Attorney, Agent, or Firm* — Womble Bond Dickinson (US) LLP (57) ABSTRACT

A method for upgrading a file system in a data storage environment is provided. A storage system identifies a set of boundaries of one or more sets of hard disks based on a first block management data structure (BMDS), where the first BMDS includes information describing a storage volume representing the one or more sets of hard disks. For each identified boundary, the storage system identifies a data block range of a set of data blocks, where the data block range includes metadata of one set of hard disks that is stored on the set of data blocks. Further, the storage system concurrently generates a plurality of second BMDSs, each of the second BMDS corresponding to one of the sets of hard disks, including simultaneously retrieving metadata of the sets of hard disks, where the second BMDSs are constructed based on the retrieved metadata, representing an upgraded file system.

24 Claims, 9 Drawing Sheets

METHOD FOR PARALLEL FILE SYSTEM UPGRADE IN VIRTUAL STORAGE ENVIRONMENT

FIELD OF THE INVENTION

Embodiments of the present invention relate generally to data storage systems. More particularly, embodiments of the invention relate to upgrading a file system in a data storage environment.

BACKGROUND

Data storage is a critical component for computing. In a computing device, it is common for the backup and archive data stored in file systems to be kept for extended periods of time. Often the expected lifespan of the data will outlast the lifespan of any storage device in the system. As a result, it is important to be able to incrementally upgrade file systems and upgrade, replace, and decommission storage devices in a data storage system.

Traditionally, some of the most common upgrades customers need to perform is disk drive upgrades and file system upgrades. This is because disk drives quickly increase in capacity and performance, and can have reliability issues that require the disks to be removed from the system. Further, upgrading the file systems and thus upgrading to larger capacity drives can reduce the system's footprint in a customer's data center, which saves rack space, cooling, and power costs for the customer. Upgrading drives with faster drive technology can improve system performance. Removing drives with known issues from a shelf and replacing them with more reliable models can also improve data reliability and reduce customer support cases. The shelf, which refers to an enclosure for a storage device, provides portability for the storage devices and efficient accessibility to transfer data from one or more storage devices.

In addition, one of most time-consuming problems customers face today is upgrading file systems in the data storage system. For example, conventionally a storage volume is presented to a file system layer, which formats an on-disk layout. As such, upgrading the data layout in such file systems typically involves rewriting metadata corresponding to each block, which may be spread throughout the storage volume and at times along with the block itself. As a result, upgrading file systems traditionally involves an input and output (IO) for each block in the file system, leading to a sizeable IO intensive process where the time-to-upgrade scales and increases with the number of blocks in the file system.

Accordingly, this conventional process is time consuming, labor-intensive, and expensive. As such, what is needed to overcome the described shortcomings and improve customer demand is a time-efficient method for concurrently upgrading a file system in a data storage environment, which can thus allow customers to upgrade, replace, and decommission disk drives at the shelf and thus migrate the data to upgraded shelves containing newer devices.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, methods and systems for upgrading a file system in a data storage system are provided, which may also be referred to as concurrent file system upgrades. Embodiments are described for identifying a set of boundaries of one or more sets of hard disks based on a first block management data structure (BMDS). As used herein, a "BMDS" may refer to a set of data-structures and programs encapsulated in a block set implementation, which includes information describing a storage volume that represents the one or more sets of hard disks. As used herein, a "block set" may refer to a data library that manages on disk space in terms of fixed sized blocks, where the block set may include multiple data blocks. Further, a first BMDS may be referred to as an initial BMDS and associated with an initial file system, while a second BMDS may be referred to as an upgraded BMDS, where each upgraded BMDS may simultaneously retrieve metadata of its respective set of hard disks, and upgraded/constructed based on the retrieved metadata that represents an upgraded file system.

In some embodiments, for each identified boundary, the storage system identifies a data block range of a set of data blocks within the identified boundary, where the data block range includes metadata of one set of hard disks that is stored on the set of data blocks. Further, according to some embodiments, the storage system concurrently generates one or more second BMDS. Each of the second BMDS corresponds to one of the sets of hard disks, and includes simultaneously retrieving metadata of the sets of hard disks. In one embodiment, the second BMDS is constructed based on the retrieved metadata, which represents an upgraded file system.

According to some embodiments, each data block range includes a first offset identifier and second offset identifier that are used to identify the boundaries of the data block range for that set of hard disks. Further, the set of data blocks may include a data header that represents metadata information of each stored metadata within each data block. The set of data blocks also includes a descriptor index table with one or more descriptors, where each descriptor is associated with a data block from the set of data blocks. As used herein, a "descriptor index table" may refer to an array of descriptors that are used to represent information of each block in a BMDS, where each descriptor is associated with one block in the BMDS. Further, each descriptor includes information representing at least one of a state of allocation, a file identifier, and an offset identifier.

In one embodiment, when the data block range of the set of data blocks within each identified boundary is identified, the storage system generates a specified metadata of one set of hard disks to be stored in each data block. The storage system then reads in parallel actions one or more specified metadata of one or more data blocks in each set of hard disks. Further, in parallel actions, the storage system upgrades the one or more specified metadata of the one or more read data blocks to a memory, and writes the one or more specified metadata of the one or more data blocks in each set of hard disks.

According to some embodiments, the metadata of each data block includes at least one of a file version, an allocation state, a data block identifier, an offset identifier, a file identifier, a file offset, an old data block identifier, and an old data block number. Further, each of the upgraded BMDS includes an upgraded data header and an upgraded descriptor index table. Also, the upgraded metadata of each of the upgraded BMDS includes a new offset identifier and a new data block identifier that are both associated with the old offset identifier and the old data block identifier of the initial BMDS.

As such, a concurrent file system upgrade may be used to reduce a customer's time-to-upgrade by performing block upgrades concurrently on multiple hard disks, which provides a time-to-upgrade time that is constant and proportional to the largest set of hard disks of the file system rather than the size of the whole file system. As used herein, a "time-to-upgrade" may refer to the total time that is required to upgrade a file system. Accordingly, the concurrent file system upgrade may then be used to reduce a customer's physical data center footprint by upgrading to larger capacity disks, and thus reducing the number of disks and enclosures required, which saves rack space and reduces cooling and power costs. Another advantage is that customers can replace faulty drives in their system by efficiently migrating their data to new and more reliable drive models, as such when data storage systems provide new storage media (e.g., flash-based SSDs), customers can migrate their data from hard disk drives to the new media without having to perform a forklift upgrade of the entire system. Accordingly, another advantage/improvement is that customers can have their head swap options limited by the kinds of drive capacities they are using as newer heads may not support the capacities of older, smaller drives, which allows customers to replace these smaller drives with larger drives that are supported by the heads they selected.

Figure 1:
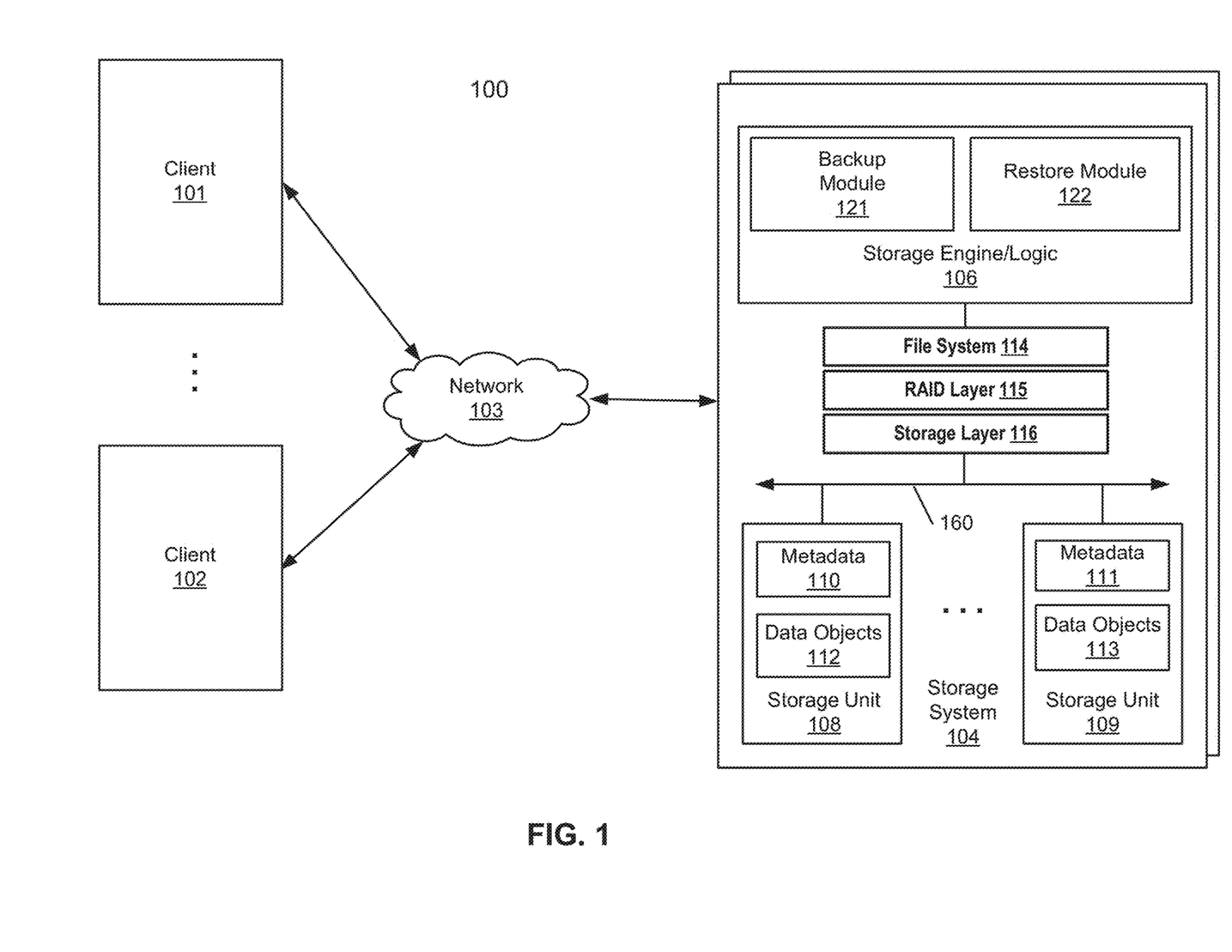
FIG. 1 is a block diagram illustrating a data storage system according to one embodiment of the invention.

FIG. 1 is a block diagram illustrating a data storage system according to one embodiment of the invention. System 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple client systems with access to shared data and/or to backup/restore data. Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof) and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup module 121 and restore module 122. Backup module 121 is configured to receive and back up data from a client (e.g., clients 101-102) and to store the backup data in any one or more of storage units 108-109. Restore module 122 is configured to retrieve and restore backup data from any one or more of storage units 108-109 back to a client (e.g., clients 101-102). Storage system 104 may include interconnect 120 that allows backup module 121 and restore module 122 to access the one or more storage units (e.g. storage units 108-109).

In one embodiment, storage layer 116 can provide a first level of abstraction of the storage units, e.g. 108 and 109. In an embodiment, one or more storage units may comprise a redundant array of independent disks (RAID), managed by RAID layer 115 over the storage layer 116. In one embodiment, file system 114 can be a next higher level of abstraction implemented on the RAID layer 115 and, in turn, upon the storage layer 116.

Storage units 108-109 may be implemented locally (e.g., single node operating environment) or remotely (e.g., multi-node operating environment) via interconnect 120, which may be a bus and/or a network (e.g., a storage network or a network similar to network 103). In one embodiment, storage units 108-109 stores, but is not limited to, metadata 110-111 and data objects 112-113. Storage units 108-109 may include a single storage device such as a hard disk, a tape drive, a semiconductor memory, multiple storage devices such as a RAID, and a system for storage such as a library system or network attached storage system, or any other appropriate storage device or system. Some of storage units 108-109 may be located locally or remotely accessible over a network.

In some embodiments, metadata 110-111 may be stored in at least some of storage units 108-109, such that files can be accessed independent of another storage unit. Metadata of each storage unit includes enough information to provide access to the files it contains. The metadata may include fingerprints contained within data objects 112-113, where a data object may represent a data chunk, a compression region (CR) of data chunks, or a container of one or more CRs. Fingerprints are mapped to a particular data object via metadata 110-111, which enable the system to identify the location of the data object containing a chunk represented by a particular fingerprint.

Note that some or all of the components as shown and described above (e.g., storage service engine 106 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application.

Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
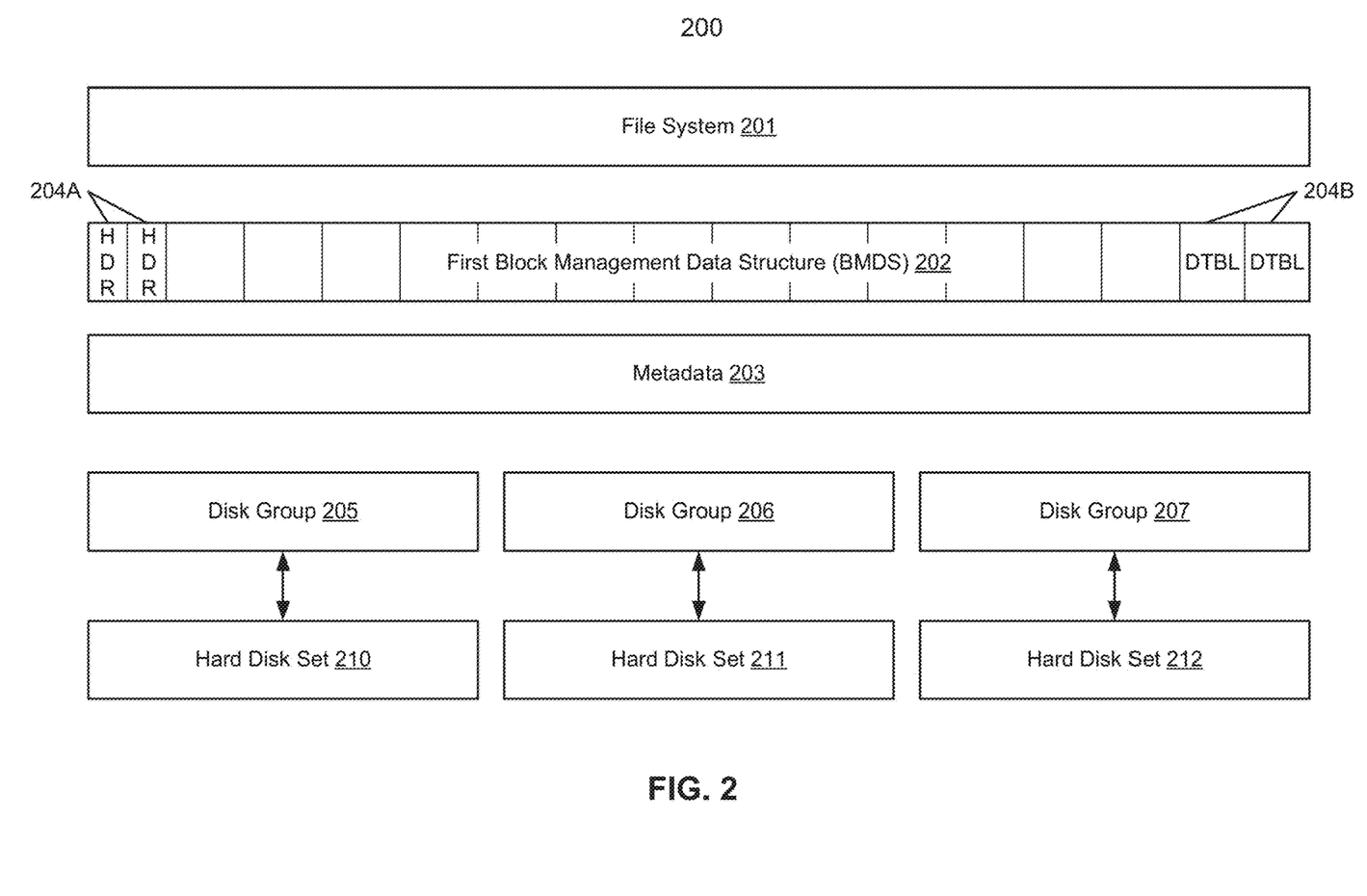
FIG. 2 is a block diagram illustrating a file system of an initial block management data structure (BMDS) in a storage system according to one embodiment of the invention.

FIG. 2 is a block diagram illustrating a traditional file system of an initial BMDS in a storage system according to one embodiment of the invention. System 200 includes, but is not limited to, file system 201, first BMDS 202, metadata 203, disk groups 205-207, and hard disk sets 210-212.

Hard disk sets 210-212 include one or more set of hard disk (e.g., RAID groups). Each hard disk set 210-212 may include, but is not limited to, one or more of a single storage device such as a hard disk, a tape drive, a semiconductor memory, multiple storage devices such as a RAID group, and a system for storage such as a library system or network attached storage system, or any other appropriate storage device or system.

According to some embodiments, system 200 organizes disks into logical groups represented as disk groups 205-207, which in turn are used to create one or more RAID arrays (e.g., hard disk sets 210-212). For example, a physical partition array may represent the RAID array on each disk group that stores user data and metadata. In general, file system 201 will group disks in the same shelf (e.g., hard disk set 210) into one disk group (e.g., disk group 205), but note that it is possible for one disk group to span one or more shelfs/enclosures.

Further, system 200 concatenates disk groups 205-207 into a logical, contiguous, linear address space, which is represented as metadata 203. As used herein, "metadata" (also referred to as metadata group) may refer to data associated with various attributes of a file, such as a file name, a file length, a date stamp, a permission, and whether a file has been removed from the current file system or has been renamed, etc. Metadata 203 enables the reconstruction of a file system (e.g., file system 201) using previously stored segments. For example, segments of data files may be stored in a deduplicated manner, either within each of disk groups 205-207 or across at least some of disk groups 210-212, where each disk group represents at least one hard disk set (e.g., hard disk sets 210-212). Further, metadata of files may also be upgraded (as discussed in further detail in FIGS. 3 and 4) according to some embodiments.

As shown in FIG. 2, metadata 203 includes an ordered list of disk groups (e.g., disk groups 205-207), their size, and their offset in the linear address space. Metadata 203 may be managed by a volume layer (also referred to as a storage volume layer), where each volume, for example, is composed of one or more metadata groups. For example, the volume layer provides input and output (I/O) access to one or more metadata groups to a storage layer of a file system (e.g., file system 201).

According to some embodiments, the storage layer partitions metadata 203 into the first BMDS 202. In an embodiment, first BMDS 202 may be represented as a set of fixed-sized blocks (also referred to as data blocks), where each block maps to a unique offset within metadata 203. As shown in FIG. 2, first BMDS 202 includes one or more data blocks, header 204A, and descriptor table 204B. Header 204A may include information to describe the first BMDS 202, including metadata of all the stored metadata within each data block. Header 204A may include information of the BMDS such as a file version, an allocation state, a data block identifier, an offset identifier, a file identifier, a file offset, an old data block identifier, and an old data block number. Descriptor table 204B may include multiple descriptors, where each descriptor is associated with a data block from the set of data blocks associated with the first BMDS 202. For example, each descriptor can include information that describes at least a state of allocation, a file identifier, and an offset identifier, which are used to map the respective blocks of the BMDS.

Further, based on first BMDS 202, a set of boundaries of one or more sets of hard disks (e.g., hard disk sets 210-212) may be identified. As discussed above, first BMDS 202 includes information that describes the storage volume layer, which represents disk groups 205-207 and hard disk sets 210-212. For example, each block of the first BMDS 202 may include metadata (e.g., metadata 203) of at least one or more hard disk sets 210-212, which is then stored in at least one or more of the blocks within the first BMDS 202. Accordingly, after the storage layer partitions metadata 203 into first BMDS 202, the storage layer then formats file system 201 over first BMDS 202.

File system 201 includes one or more file system blocks, represented by first BMDS 202. Some of the file system blocks are data blocks, some file system blocks may be indirect block, or some file system blocks are free blocks that have not yet been allocated to any file in the file system. For example, such as a traditional mapping protocol of a UNIX-based file system (e.g., an indirect mapping protocol), the traditional mapping protocol permits any free block of the file system to be allocated to a file of the file system and mapped to any logical block of a logical extent of the file. This unrestricted mapping ability of the traditional mapping protocol of a UNIX-based file system is a result of the fact that metadata (e.g., metadata 203) for each file includes a respective pointer to each data block of the file of the file system. Each file of the file system includes a block pointer array containing pointers to data blocks of the file, where some block pointers of a file point directly at data blocks, other block pointers of the file points at blocks of more pointers.zxxz As discussed above, the storage layer of the file system may provide space to clients (e.g., clients 101-102 of FIG. 1) by allocating these blocks one at a time. After allocating the blocks, the blocks of the initial BMDS are used to store user data and metadata without regard to the physical location of the data (i.e., without regard to the data's offset within the metadata group, or which disk group stores the data). For example, each of the blocks has an embedded offset that is associated with its location in the metadata logical address space. Similarly, each disk group has an embedded offset that is associated with its location within the metadata. As a result, removing any of the blocks of the initial BMDS would result in "holes" (missing blocks) in the storage layer file system's address space. This would lead to cumbersome obstacles for the file system, as removing any shelf would result in holes (e.g., missing a disk group space and/or an incomplete metadata group) in the metadata's address space, which a traditional file system (as shown in FIG. 2) may not be able to handle.

As such, the ability to replace and remove a shelf, which includes multiple BMDSs, depends on safely migrating all of the user data and metadata off the existing shelf onto another shelf or shelves. Note that removing or replacing disk shelves that have been already been added to a file system creates complicated problems and challenges. For example, if a client needs to perform this type of operation (i.e. upgrading a file system), it typically requires replicating all of the data to a replica system, destroying and recreating the file system without the shelf, and then replicating all of the data back. Consequently, this traditional process is time consuming, labor-intensive, and expensive, as upgrading involves an IO for each block in the file system that creates a heavy IO intensive process and thus the time-to-upgrade scales with the total number of blocks in the file system. Accordingly, as shown in FIG. 2, system 200 illustrates why it is difficult in the traditional architecture to remove user data and metadata off a first shelf and migrate the data to a second shelf.

Figure 3:
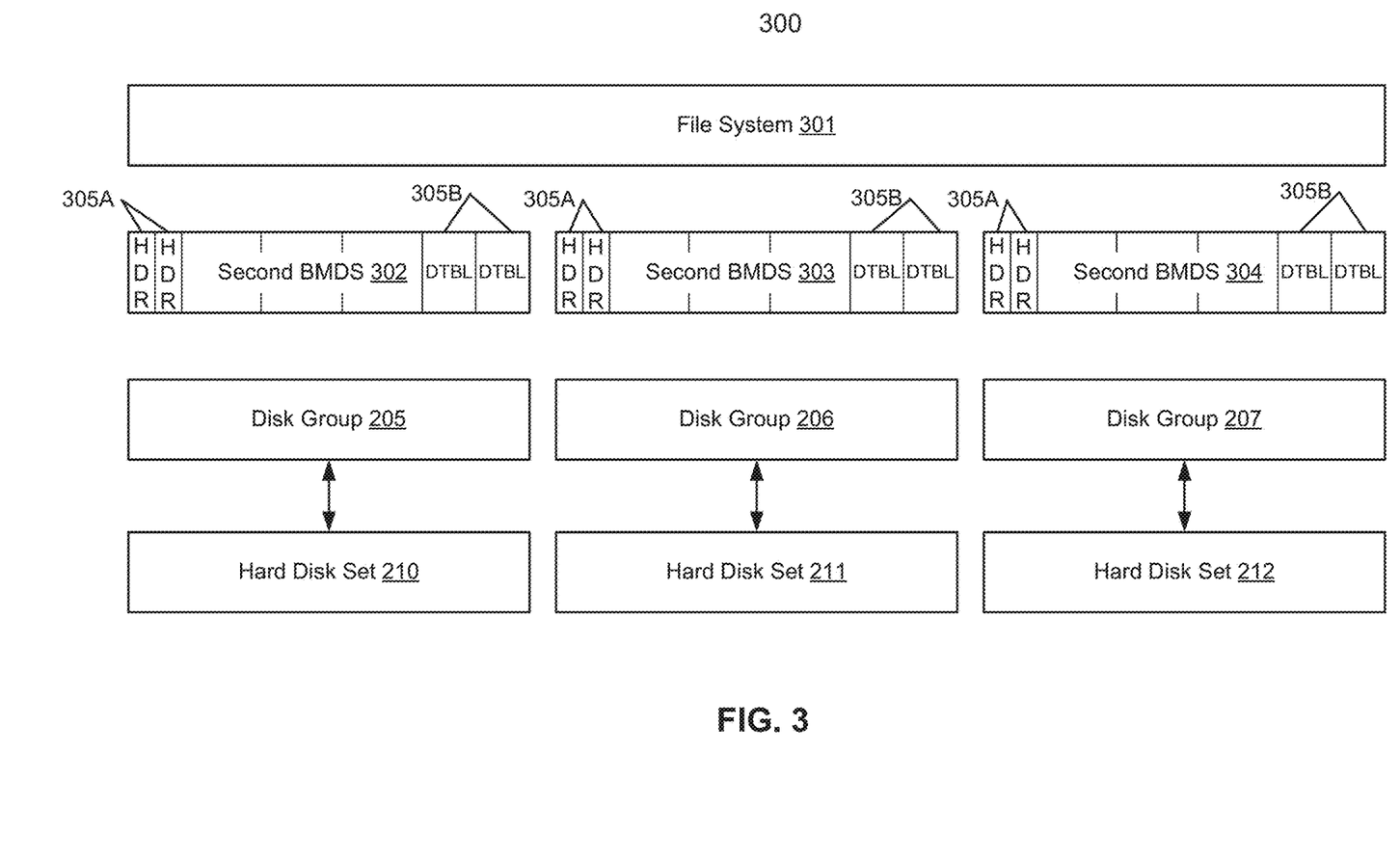
FIG. 3 is a block diagram illustrating an upgraded file system of one or more upgraded BMDSs in a storage system according to one embodiment of the invention.

FIG. 3 is a block diagram illustrating an upgraded file system of one or more upgraded BMDSs in a storage system. In other words, system 300 illustrates a process of concurrently generating one or more upgraded BMDSs (e.g., second BMDSs 302-304) based on an initial BMDS (e.g., first BMDS of FIG. 2).

Referring now to FIG. 3, system 300 includes, but is not limited to, file system 301, second BMDSs 302-304, headers 305A, descriptor tables 305B, disk groups 205-207, and hard disk sets 210-212. As a result of the described shortcomings associated with system 200 of FIG. 2, a concurrent file system upgrade is provided that identifies a set of boundaries of one or more sets of hard disks 210-212 based on the first BMDS 201 of FIG. 2. For each identified boundary, the concurrent file system upgrade identifies a data block range of a set of data blocks within the identified boundary, where the data block range includes metadata of one set of hard disks that is stored on that set of data blocks.

Further, as illustrated in FIG. 3, the concurrent file system upgrade concurrently generates one or more second BMDSs 302-304. For example, second BMDS 302 corresponds to hard disk set 210, second BMDS 303 corresponds to hard disk set 211, and second BMDS 304 corresponds to hard disk set 212. Further, each second BMDS 302-304 simultaneously retrieves metadata of its respective hard disk set 210-212, where as a result each upgraded BMDS 302-304 is constructed based on the retrieved metadata representing an upgraded file system (e.g., file system 301). This also allows each disk group 205-207 to be respectively associated with its own upgraded BMDS 302-305 by upgrading the metadata of each initial block and then rebuilding the upgraded metadata to its respective individual and upgraded BMDS. In one embodiment, each second BMDS includes upgraded data headers 305A and upgraded descriptor index tables, which are used to map the upgraded file system from the initial blocks to the upgraded blocks (as illustrated in FIGS. 4 and 5).

Accordingly, system 300 improves a data storage computer/server by significantly reducing the time-to-upgrade within the computer itself. To do so, system 300 identifies the device boundaries in a BMDS (e.g., a linear address space) by querying a lower layer (e.g., a volume layer) and then parallelly/concurrently performs one or more block upgrades on all of the devices. As such, according to some embodiments, the time-to-upgrade drastically improved and is constant and proportional to the largest device in the file system, rather than the size of the whole file system. Note that applying parallelism on the blocks within a device further improves the time-to-upgrade.

For example, upgrading file systems that have its metadata distributed across an entire volume provides an IO intensive and time consuming operation, which the time-to-upgrade may be several hours. In this example, traditional techniques, such as issuing several parallel IOs, will not enhance the performance as the IOs will quickly reach the IOPS (I/O operations per second) limits of the device. To overcome the described shortcomings, the concurrent file system upgrade is provided to improve the time-to-upgrade for each data storage computer (e.g., time-to-upgrade has reduced from several hours to a few minutes).

Figure 4:
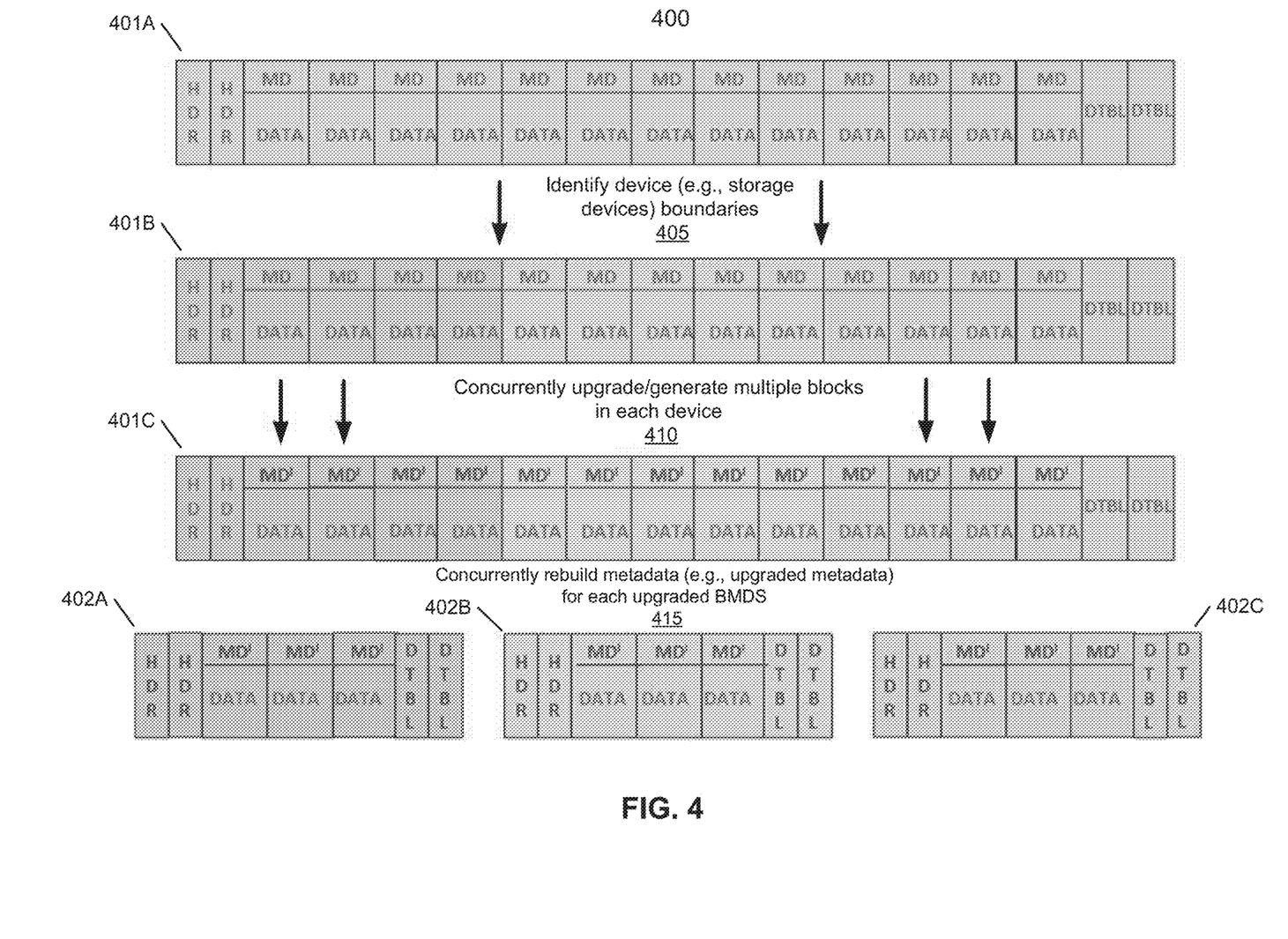
FIG. 4 is a block diagram illustrating a concurrent file system upgrade process from an initial BMDS to one or more upgraded BMDS according to one embodiment of the invention.
Figure 5:
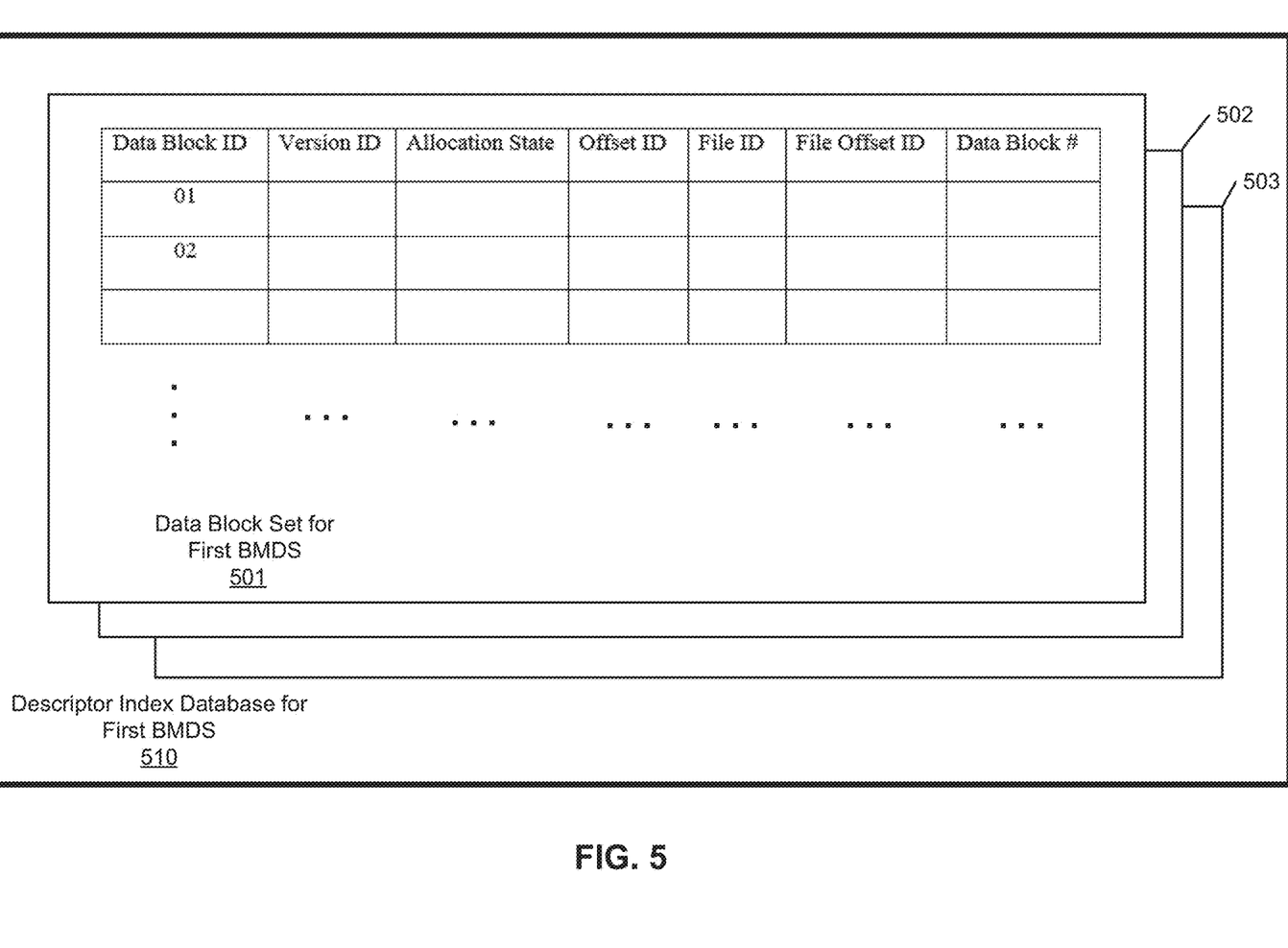
FIG. 5 is a block diagram illustrating multiple data block sets in a descriptor index database for an initial BMDS according to one embodiment of the invention.

FIG. 4 is a block diagram illustrating a concurrently upgrading file system process from an initial BMDS to one or more upgraded BMDS according to one embodiment of the invention. Process 400 can be performed by processing logic which may be implemented in software, firmware, hardware, or any combination thereof. Process 400 includes, but is not limited to, initial BMDSs 401A-C and upgraded BMDSs 402A-C. Referring now to FIG. 4, at step 405, processing logic identifies a set of boundaries of one or more devices (i.e., set of hard disks) based on an initial BMDS. For example, the initial BMDS (e.g., 401A) may be separated into one or more boundaries (e.g., 401B) after identifying the respective boundaries of the one or more devices.

At step 410, processing logic concurrently upgrades one or more blocks in each device. For example, the BMDS with identified boundaries (e.g., 401B) is concurrently upgraded from one or more initial blocks (i.e., initial metadata) to one or more upgraded blocks (i.e., upgraded metadata) for each respective device (e.g., 401C). The upgraded metadata may of each upgraded BMDS may include a new offset identifier (e.g., a new_offset) that is relative to the upgraded BMDS and a new data block identifier (e.g., a new_blkset_id), where both identifiers are associated with the old offset identifier and the old data block identifier of the initial BMDS. For example, each upgraded/allocated block may be represented as MD1.offset=new_offset and MD1.blkset_id=new_blkset_id.

According to some embodiment, when upgrading one or more blocks in each device, processing logic may generate specified metadata of one set of hard disks to be stored in each data block. Further, in parallel actions, processing logic may also read the one or more specified metadata of one or more data blocks in each set of hard disks, upgrade the one or more specified metadata of the one or more read data blocks to a memory, and write the one or more specified metadata of the one or more data blocks in each set of hard disks.

At step 415, processing logic concurrently rebuilds metadata for each upgraded BMDS. For example, one or more upgraded BMDSs (e.g., 402A-C) are concurrently generated from the initial BMDS (e.g., 401C), where each of the upgraded BMDS corresponds to one device. Each upgraded BMDS simultaneously retrieves metadata of its respective device and is thus constructed based on the retrieved metadata, which represents an upgraded file system. Accordingly, the upgraded file system is parallelly rebuilt from the block set level metadata on each device to form an individual block set for every device.

FIG. 5 is a block diagram illustrating multiple data block sets 501-503 in a descriptor index database for an initial BMDS 510 according to one embodiment of the invention. According to one embodiment, descriptor index database 510 may be stored at storage system 104 of FIG. 1. In one embodiment, descriptor index database 510 may include one or more data block sets 501-503 and represent metadata of one or more initial BMDSs. For example, each data block set may represent one or more identifiers (i.e., a library) used to manage on disk space and allocation in relation to the data blocks.

Data block set 501 may include, but is not limited to, a data block ID, a version ID, an allocation state, an offset ID, a file ID, a file offset ID, and a data block number. For example, each of these identifiers are used to map and describe each block's metadata of an initial BMDS with a hard disk set.

Figure 6:
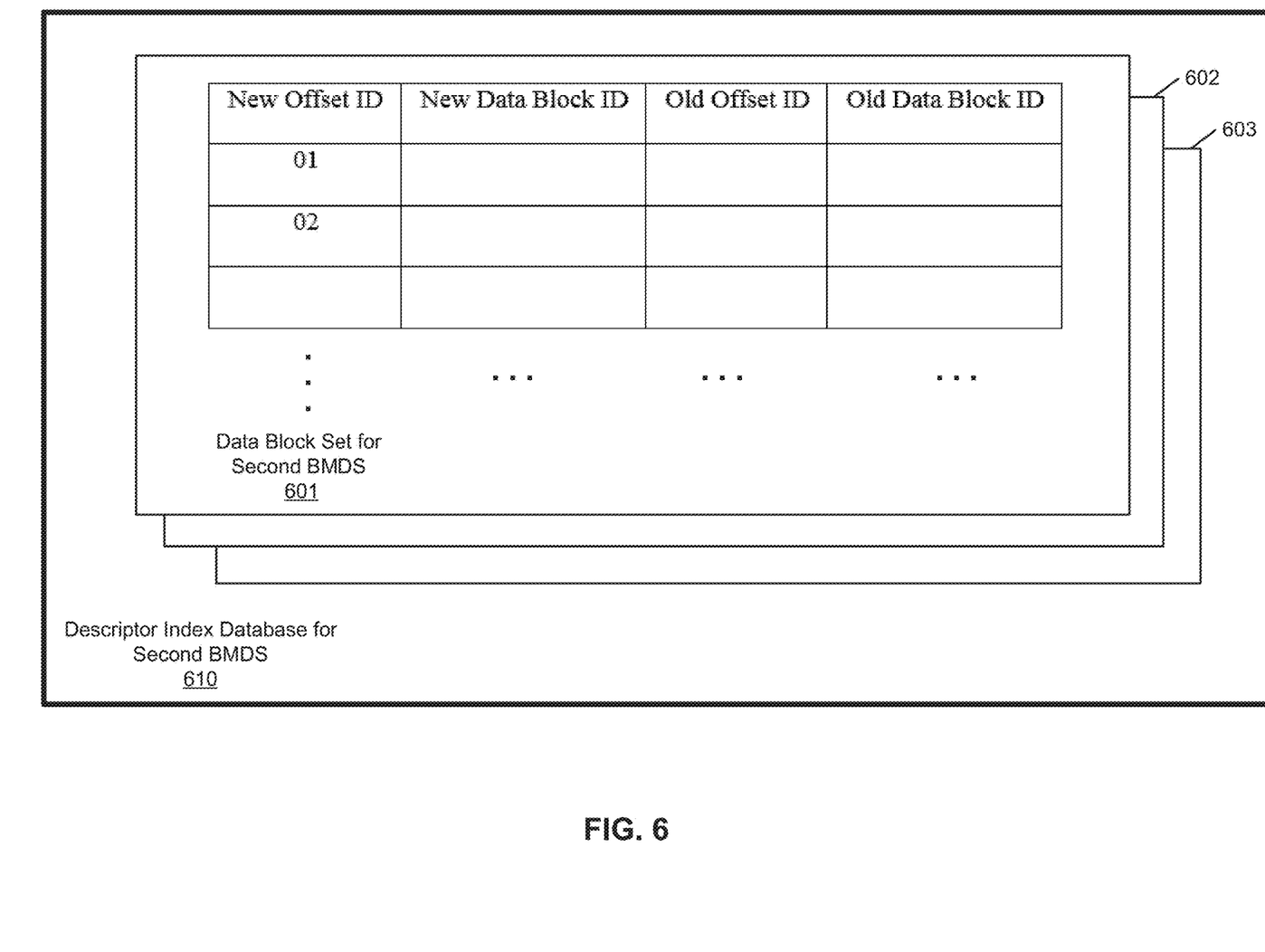
FIG. 6 is a block diagram illustrating multiple data block sets in a descriptor index database for an upgraded BMDS according to one embodiment of the invention.

FIG. 6 is a block diagram illustrating multiple data block sets 601-603 in a descriptor index database for an upgraded BMDS 610 according to one embodiment of the invention. According to one embodiment, descriptor index database 610 may be stored at storage system 104 of FIG. 1. In one embodiment, descriptor index database 610 may include one or more data block sets 601-603 and represent upgraded metadata of one or more upgraded BMDSs.

Data block set 601 may include, but is not limited to, a new offset ID, a new data block ID, an old offset ID, and an old data block ID. For example, each of these identifiers are used to map and describe each block's upgraded metadata of the upgraded BMDS with a hard disk set. For example, the upgraded metadata may of each upgraded BMDS includes the new offset identifier (e.g., new_offset) that is relative to the upgraded BMDS and the new data block identifier (e.g., new_blkset_id), where both identifiers are associated with the old offset identifier and the old data block identifier of the initial BMDS. For example, each upgraded/allocated block may be represented as MD1.offset=new_offset and MD1.blkset_id=new_blkset_id.

Figure 7:
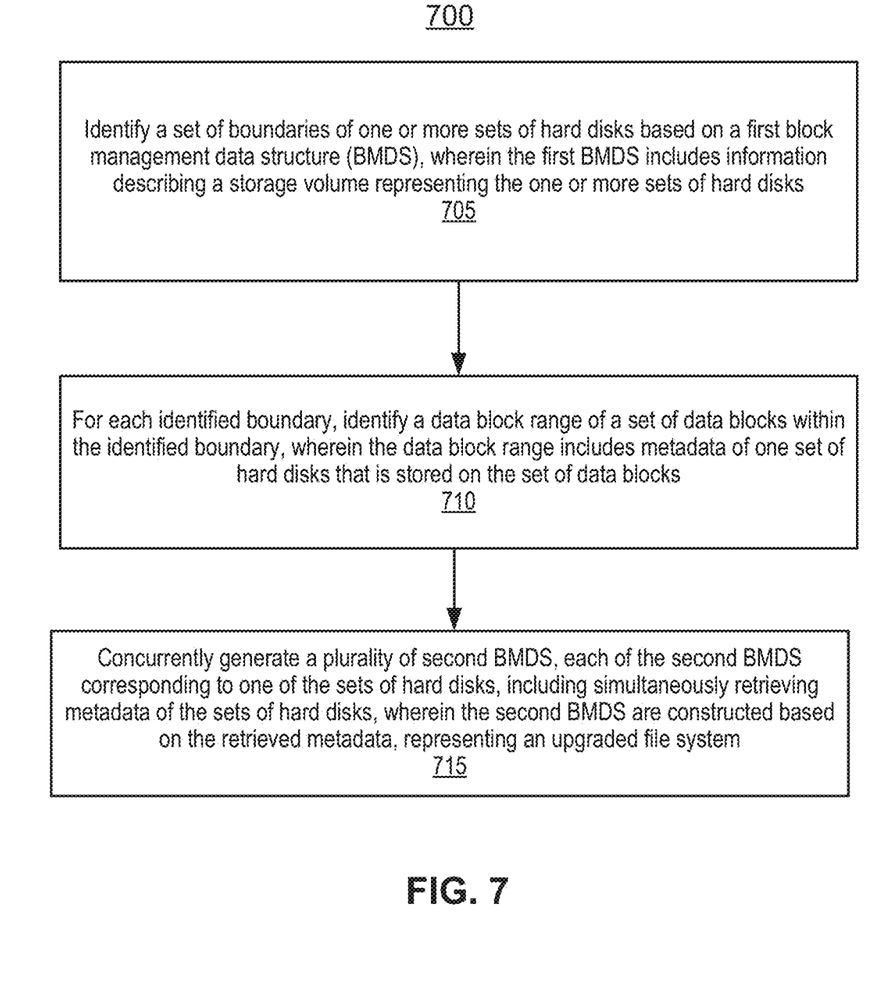
FIG. 7 is a flowchart illustrating a method for upgrading a file system in a data storage environment according to one embodiment of the invention.

FIG. 7 is a flowchart illustrating a method for upgrading a file system in a data storage environment according to one embodiment of the invention. Flowchart 700 can be performed by processing logic which may be implemented in software, firmware, hardware, or any combination thereof.

Referring now to FIG. 7, at block 705, processing logic identifies a set of boundaries of one or more sets of hard disks based on a first BMDS, where the first BMDS includes information describing a storage volume representing the one or more sets of hard disks.

At block 710, for each identified boundary, processing logic identifies a data block range of a set of data blocks within the identified boundary, where the data block range includes metadata of one set of hard disks that is stored on the set of data blocks. Further, each data block range may include a first offset identifier and second offset identifier that are used to identify the boundaries of the data block range for that set of hard disks. In one embodiment, the set of data blocks may include a data header that includes metadata information of each stored metadata within each data block, and a descriptor index table that includes one or more descriptors, where each descriptor is associated with a data block from the set of data blocks and includes information representing at least one of a state of allocation, a file identifier, and an offset identifier that are used to respectively map each block within a BMDS.

At block 715, processing logic concurrently generates one or more second BMDSs, each of the second BMDS corresponding to one of the sets of hard disks, including simultaneously retrieving metadata of the sets of hard disks, where the one or more second BMDSs are constructed based on the retrieved metadata, representing an upgraded file system. In one embodiment, each second BMDS includes an upgraded data header and an upgraded descriptor index table, which are used to map the upgraded file system from the initial blocks to the upgraded blocks. Further, the metadata of each block may include a file version, an allocation state, a data block identifier, an offset identifier, a file identifier, a file offset, an old data block identifier, and an old data block number. Likewise, the upgraded metadata of each of the second BMDS includes a new offset identifier and a new data block identifier that are associated with the old offset identifier and the old data block identifier of the first BMDS.

Figure 8:
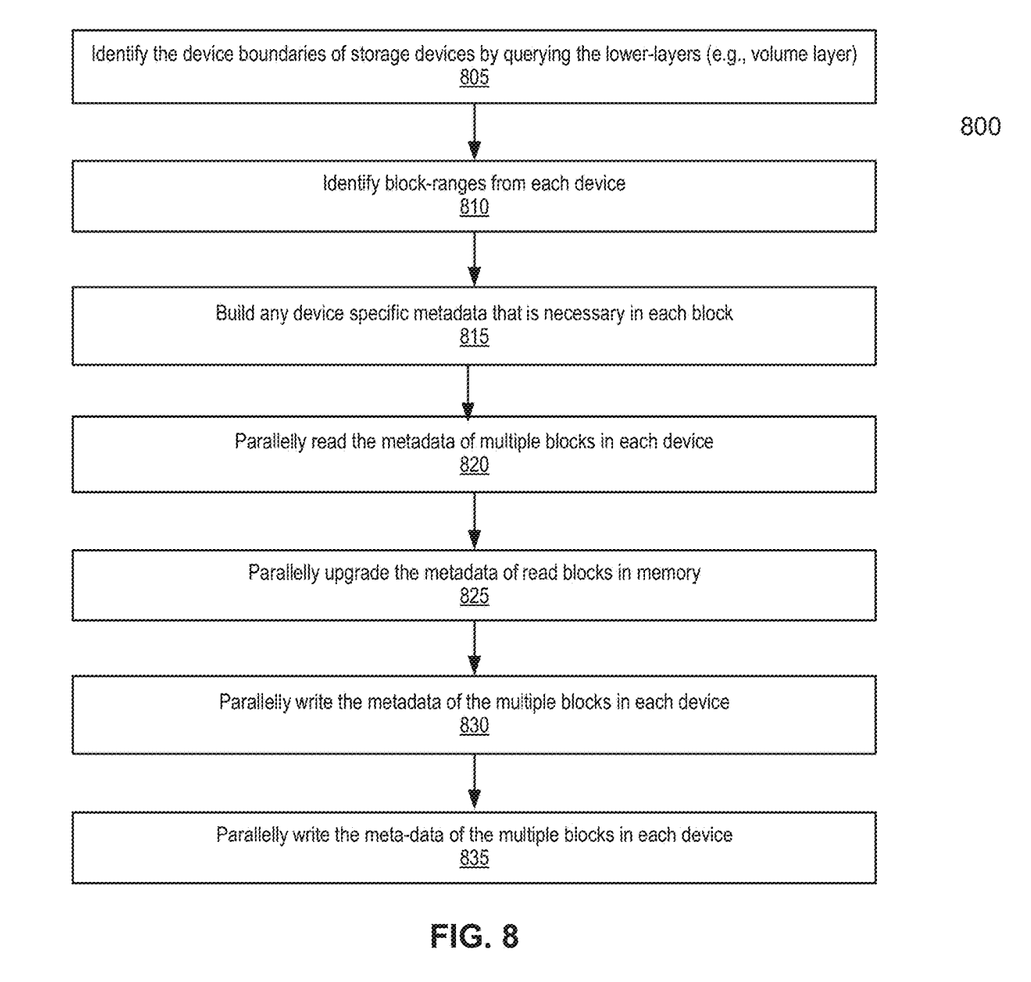
FIG. 8 is a flowchart illustrating a method for upgrading a file system in a data storage environment according to one embodiment of the invention.

FIG. 8 is a flowchart illustrating a method for upgrading a file system in a data storage environment according to one embodiment of the invention. Flowchart 800 can be performed by processing logic which may be implemented in software, firmware, hardware, or any combination thereof. Referring now to FIG. 8, at block 805, processing logic identifies the device boundaries of storage devices by querying the lower-layers (e.g., volume layer). At block 810, processing logic identifies block ranges for each device. At block 815, processing logic builds any device specific metadata that is necessary in each block. At block 820, processing logic parallelly reads the metadata of multiple blocks in each device. At block 825, processing logic parallelly upgrades the metadata of the read blocks in a memory. At block 830, processing logic parallelly writes the metadata of the multiple blocks in each device. At block 835, processing logic parallelly writes the metadata of the multiple blocks in each device.

Figure 9:
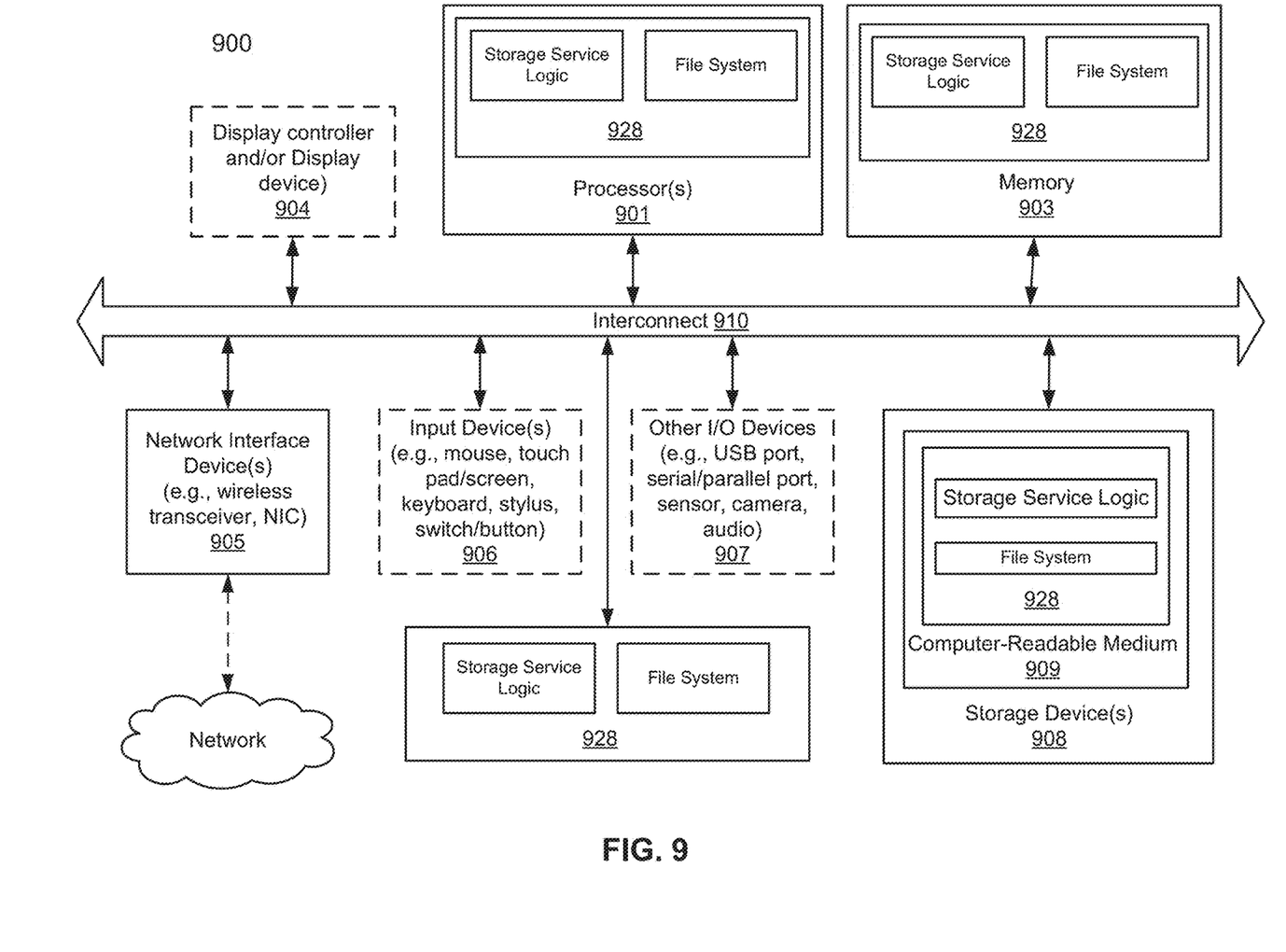
FIG. 9 is a block diagram illustrating a data processing system according to one embodiment.

FIG. 9 is a block diagram illustrating a data processing system according to one embodiment. For example, system 900 may represent any of data processing systems described above performing any of the processes or methods described above. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 904-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 900 may further include IO devices such as devices 904-908, including display device(s) 904, network interface device(s) 905, optional input device(s) 906, and other optional IO device(s) 907, and storage device(s) 908. Network interface device 905 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of one or more touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However, in other embodiments, the mass storage may primarily be implemented using a HDD with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including a basic input/output software (BIOS) as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Module/unit/logic 928 (e.g., storage service logic and/or file system) may also reside, completely or at least partially, within memory 903 and/or within processor 901 during execution thereof by data processing system 900, memory 903 and processor 901 also constituting machine-accessible storage media. Module/unit/logic 928 may further be transmitted or received over a network via network interface device 905.

Computer-readable storage medium 909 may also be used to store some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 928, components and other features described herein can be implemented as discrete hardware components or integrated in the functionality of hardware components such as ASICS, FPGAs, DSPs or similar devices. In addition, module/unit/logic 928 can be implemented as firmware or functional circuitry within hardware devices. Further, module/unit/logic 928 can be implemented in any combination hardware devices and software components.

Note that while system 900 is illustrated with various components of a data processing system, it is not intended to represent any particular architecture or manner of interconnecting the components, as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for upgrading a file system in a data storage environment, the method comprising:

identifying a set of boundaries of a plurality of sets of hard disks based in a first block management data structure (BIMDS) based on information retrieved from a volume layer, wherein the first BMDS comprises a header and a descriptor table, and includes information describing a storage volume representing the plurality of sets of hard disks, wherein each boundary in the set of boundaries divides continuous offsets in a linear address space of the first BMDS that correspond to different sets of hard disks;

based on the identified boundaries, identifying a plurality of non-overlapping data block ranges that in aggregate cover the whole storage volume, each data block range corresponding to one of the plurality of sets of hard disks, and comprising set of data blocks stored on the corresponding set of hard disks, wherein each data block range includes metadata of the corresponding set of hard disks that is stored on the set of data blocks; and concurrently generating a plurality of second BMDSs, each of the second BMDSs comprising a respective header and a respective descriptor table, and corresponding to one of the data block ranges and its corresponding set of hard disks, including simultaneously retrieving or operating on metadata of different data block ranges in parallel, including reading from or writing to different sets of hard disks in parallel, wherein the plurality of second BMDSs are constructed based on the retrieved metadata, representing an upgraded file system.

2. The method of claim 1, wherein each data block range further comprises a first offset identifier and second offset identifier that are used to identify the boundaries of the data block range for that set of hard disks.

3. The method of claim 1, wherein the set of data blocks further comprises:
   a data header that includes metadata information of each stored metadata within each data block; and
   a descriptor index table that includes a plurality of descriptors, wherein each descriptor is associated with a data block from the set of data blocks.

4. The method of claim 3, wherein each descriptor further comprises information that includes at least one of a state of allocation, a file identifier, and an offset identifier.

5. The method of claim 3, wherein the metadata of each data block includes at least one of a file version, an allocation state, a data block identifier, an offset identifier, a file identifier, a file offset, an old data block identifier, and an old data block number.

6. The method of claim 1, wherein concurrently generating the plurality of second BMDSs further comprises:
   generating specified metadata of one set of hard disks to be stored in each data block;
   reading in parallel actions one or more specified metadata of one or more data blocks in each set of hard disks;
   upgrading in parallel actions the one or more specified metadata of the one or more read data blocks to a memory; and
   writing in parallel actions the one or more specified metadata of the one or more data blocks in each set of hard disks.

7. The method of claim 1, wherein each of the second BMDS includes an upgraded data header and an upgraded descriptor index table.

8. The method of claim 1, wherein the upgraded metadata of each of the second BMDS includes a new offset identifier and a new data block identifier that are both associated with the old offset identifier and the old data block identifier of the first BMDS.

9. A non-transitory machine-readable medium having instructions stored therein, which when executed by a processor, cause the processor to perform operations for upgrading a file system in a data storage environment, the operations comprising:
   identifying a set of boundaries of a plurality of sets of hard disks in a first block management data structure (BMDS) based on information retrieved from a volume layer, wherein the first BMDS comprises a header and a descriptor table, and includes information describing a storage volume representing the plurality of sets of hard disks, wherein each boundary in the set of boundaries divides continuous offsets in a linear address space of the first BMDS that correspond to different sets of hard disks;
   based on the identified boundaries, identifying a plurality of non-overlapping data black ranges that in aggregate cover the whole storage volume, each data block range corresponding to one of the plurality of sets of hard disks, and comprising a set of data blocks stored on the corresponding set of hard disks, wherein each data block range includes metadata of the corresponding set of hard disks that is stored on the set of data blocks; and
   concurrently generating a plurality of second BMDSs, each of the second BMDSs comprising a respective header and a respective descriptor table, and corresponding to one of the data block ranges and its corresponding set of hard disks, including simultaneously retrieving or operating on metadata of different data block ranges in parallel, including reading from or writing to different sets of hard disks in parallel, wherein the plurality of second BMDSs are constructed based on the retrieved metadata, representing an upgraded file system.

10. The medium of claim 9, wherein each data block range further comprises a first offset identifier and second offset identifier that are used to identify the boundaries of the data block range for that set of hard disks.

11. The medium of claim 9, wherein the set of data blocks further comprises:
   a data header that includes metadata information of each stored metadata within each data block; and
   a descriptor index table that includes a plurality of descriptors, wherein each descriptor is associated with a data block from the set of data blocks.

12. The medium of claim 11, wherein each descriptor further comprises information that includes at least one of a state of allocation, a file identifier, and an offset identifier.

13. The medium of claim 11, wherein the metadata of each data block includes at least one of a file version, an allocation state, a data block identifier, an offset identifier, a file identifier, a file offset, an old data block identifier, and an old data block number.

14. The medium of claim 9, wherein concurrently generating the plurality of second BMDSs further comprises:
   generating specified metadata of one set of hard disks to be stored in each data block;
   reading in parallel actions one or more specified metadata of one or more data blocks in each set of hard disks;
   upgrading in parallel actions the one or more specified metadata of the one or more read data blocks to a memory; and
   writing in parallel actions the one or more specified metadata of the one or more data blocks in each set of hard disks.

15. The medium of claim 9, wherein each of the second BMDS includes an upgraded data header and an upgraded descriptor index table.

16. The medium of claim 9, wherein the upgraded metadata of each of the second BMDS includes a new offset identifier and a new data block identifier that are both associated with the old offset identifier and the old data block identifier of the first BMDS.

17. A system, comprising:
   a processor; and
   a memory coupled to the processor for storing instructions, which when executed from the memory, cause the processor to perform operations for upgrading a file system in a data storage environment, the operations including:
      identifying a set of boundaries of a plurality of sets of hard disks in a first block management data structure (BMDS) based on information retrieved from a volume layer, wherein the first BMDS comprises a header and a descriptor table, and includes information describing a storage volume representing the plurality of sets of hard disks, wherein each boundary in the set of boundaries divides continuous offsets in a linear address space of the first BMDS that correspond to different sets of hard disks;

based on the identified boundaries, identifying a plurality of non-overlapping data block ranges that in aggregate cover the whole storage volume, each data block range corresponding to one of the plurality of sets of hard disks, and comprising a set of data blocks stored on the corresponding set of hard disks, wherein each data block range includes metadata of the corresponding set of hard disks that is stored on the set of data blocks; and concurrently generating a plurality of second BMDSs, each of the second BMDs comprising a respective header and a respective descriptor table, and corresponding to one of the data block ranges and its corresponding set of hard disks, including simultaneously retrieving or operating on metadata of different data block ranges in parallel, including reading from or writing to different sets of hard disks in parallel, wherein the plurality of second BMDSs are constructed based on the retrieved metadata, representing an upgraded file system.

18. The system of claim 17, wherein each data block range further comprises a first offset identifier and second offset identifier that are used to identify the boundaries of the data block range for that set of hard disks.

19. The system of claim 17, wherein the set of data blocks further comprises:
   a data header that includes metadata information of each stored metadata within each data block; and
   a descriptor index table that includes a plurality of descriptors, wherein each descriptor is associated with a data block from the set of data blocks.

20. The system of claim 19, wherein each descriptor further comprises information that includes at least one of a state of allocation, a file identifier, and an offset identifier.

21. The system of claim 19, wherein the metadata of each data block includes at least one of a file version, an allocation state, a data block identifier, an offset identifier, a file identifier, a file offset, an old data block identifier, and an old data block number.

22. The system of claim 17, wherein concurrently generating the plurality of second BMDSs further comprises:
   generating specified metadata of one set of hard disks to be stored in each data block;
   reading in parallel actions one or more specified metadata of one or more data blocks in each set of hard disks;
   upgrading in parallel actions the one or more specified metadata of the one or more read data blocks to a memory; and
   writing in parallel actions the one or more specified metadata of the one or more data blocks in each set of hard disks.

23. The system of claim 17, wherein each of the second BMDS includes an upgraded data header and an upgraded descriptor index table.

24. The system of claim 17, wherein the upgraded metadata of each of the second BMDS includes a new offset identifier and a new data block identifier that are both associated with the old offset identifier and the old data block identifier of the first BMDS.

* * * * *